United States Patent [19]

Ellsworth

[11] Patent Number: 5,048,671
[45] Date of Patent: Sep. 17, 1991

[54] BELT-PULLED DRAG CONVEYOR

[75] Inventor: Clayton S. Ellsworth, Norfolk, Nebr.

[73] Assignee: EBM Mill & Elevator Supply, Inc., Norfolk, Nebr.

[21] Appl. No.: 615,409

[22] Filed: Nov. 19, 1990

[51] Int. Cl.[5] .................................................. B65G 19/00
[52] U.S. Cl. .................................... 198/728; 198/725; 198/716
[58] Field of Search ............... 198/716, 725, 727, 728, 198/729, 731, 733, 734, 717

[56] References Cited

U.S. PATENT DOCUMENTS

| | | | |
|---|---|---|---|
| 1,643,786 | 9/1927 | Peale | 198/727 |
| 2,276,978 | 3/1942 | Hyman et al. | 198/728 X |
| 2,383,932 | 9/1945 | Brunner | 198/729 |
| 2,643,760 | 6/1953 | Bostner | 198/725 X |
| 2,646,158 | 7/1953 | Vodoz | 198/731 |
| 2,678,664 | 5/1954 | Bostner | 198/716 X |
| 2,782,899 | 2/1957 | Yuenger | 198/729 |
| 3,061,073 | 10/1962 | Wickam | 198/727 |
| 3,147,850 | 9/1964 | Ronceray | 198/716 X |
| 3,447,667 | 6/1969 | Patz et al. | 198/730 |
| 3,762,535 | 10/1973 | Becker et al. | 198/716 |
| 3,881,590 | 5/1975 | Hastmann | 198/716 X |
| 4,241,823 | 12/1980 | Clewett | 198/727 |

FOREIGN PATENT DOCUMENTS 0711048  6/1954  United Kingdom ............... 198/733

Primary Examiner—Robert P. Olszewski
Assistant Examiner—James R. Bidwell

[57] ABSTRACT

A conveyer for particulate or comminuted material having flighting carried by a belt rather than a chain or cable. The flat belt is oriented with its broad sides in a substantially vertical plane and is driven and supported by pulleys at each end of the trough.

4 Claims, 1 Drawing Sheet

BELT-PULLED DRAG CONVEYOR

BACKGROUND AND SUMMARY OF THE INVENTION

This invention pertains to a drag conveyer using flighting in a trough for the conveyance of particulate or comminuted material, and more particularly to such a conveyor in which the vibration is greatly reduced by use of novel means for connecting the flighting and transmitting motion to that flighting.

Drag conveyors for conveying such materials as crushed rock, gravel as well as farm produced grains are well known. Nearly all such conveyors use transverse flighting bars connected together by chains at each edge. The chains run over sprockets which are driven and thus pull the chain. This type of construction almost requires that one set of flighting be displaced vertically from the return, thus eliminating any use of side by side troughs, or orientations than a straight line.

Cable-pulled flighting has been proposed. However, the drive sprockets for such a conveyor must also be notched to provide for reasonably smooth pulling so that the points of connection of flighting to the pulling cable do not interfere with the periphery of the pulley or sprocket. Thus, the spacing of the flighting on the cable must be an aliquot part of the circumference of the pulley.

In either of the former devices, vibration is common. Particularly in the chain-pulled conveyor, the flighting is constantly vibrated by meshing of the chains with the sprockets. The same type of vibrations are set up in the cable-pulled device because of the passage of the attachments into and out of slots in the rim of the cable for the pulley. These vibrations cause a jerkiness in the pulling of the flighting which can be detrimental where the material being moved is a fragile material such as grain. There is a tendency for fragile products to wedge under the flighting and be cracked or ground as the vibrations cause the flighting to bounce on the trough.

By my invention I provide a conveyor free of troublesome vibration induced by problems of meshing. My conveyor can use any spacing of flights without concern for meshing with any sprockets or cut-out rims of pulleys. Thus, there is no need for exact spacing of the blades of this flighting nor for unnecessary care in placing the assembled blades and pulley mechanism in the trough and engaging the pulley which drive the conveyor.

Also, by my invention I provide a smooth running conveyor which can be used to move materials in other than a straight line, but rather can be used in non-linear paths on a substantially horizontal plane.

DESCRIPTION

Briefly, my invention comprises a drag conveyor in which the flighting or conveyor paddles are mounted on a smooth belt which permits driving by a smooth pulley resulting in a lowered vibration of the flighting and allows a multilinear path for the conveyor.

More specifically and referring to the figures, the conveyor includes a trough 10 in which a flighting 11 is disposed. The flighting consists of a series of paddles or flight units 12 which are fastened to a flat belt 13. The belt 13 has flat sides lying in a plane perpendicular to the direction of motion of the flighting so that if the direction of motion is in a substantially horizontal plane, the belt will bend easily in that same plane.

Figure 2:
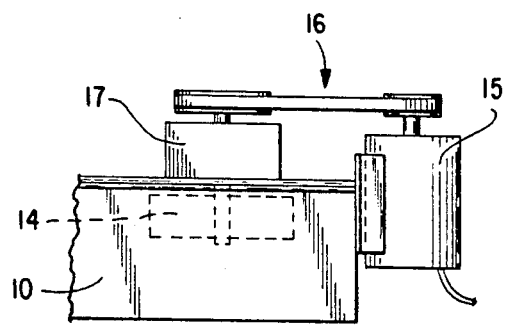
FIG. 2 is an elevational view from line 2—2 of a power unit adapted to drive the conveyor.
Figure 3:
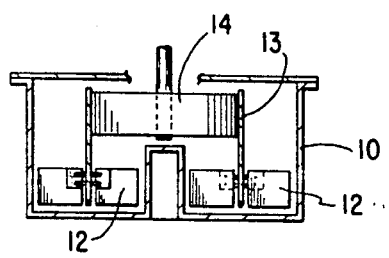
FIG. 3 is a sectional view from line 3—3 of FIG. 1.

The drive means for the conveyor includes a drive pulley 14 having a flat rim similar to any pulley driving a flat belt. Because the belt 13 extends substantially above the flight units or paddles 12, that part of the belt will readily engage the pulley 14 and be driven by it. As shown in FIG. 2 the driven pulley 14 may be driven by a motor 15 mounted on the trough 10 and driving through a belt and pulley drive 16. The bearing block 17 may also be mounted on the top of the trough 10.

Figure 1:
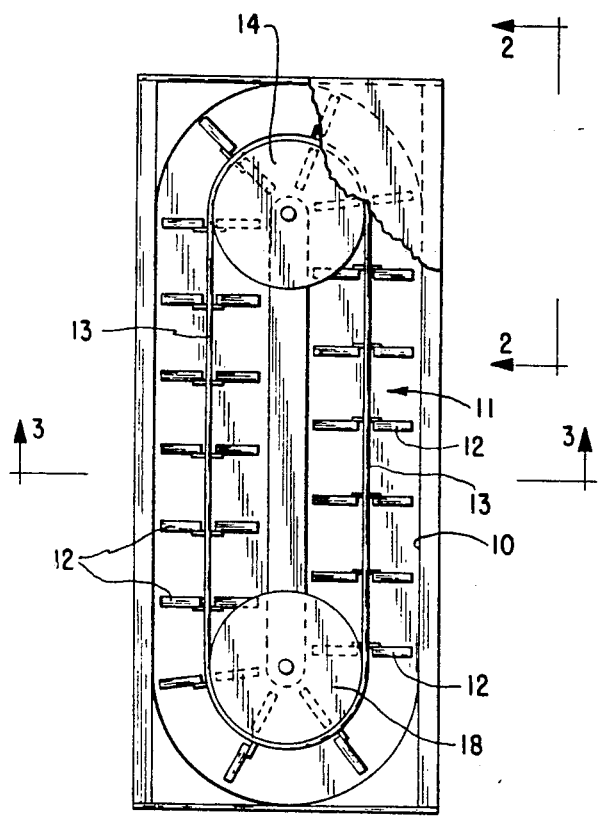
FIG. 1 is a simplified top plan view of a conveyor embodying my invention.

It will be apparent that although the illustration in FIG. 1 is of a single trough 10 having a return and a single idler pulley 18, the device can be extended in other directions so that a triangular shape of troughs 10 could be accomplished by using two idlers, or a wider rectangle with three idlers.

Figure 4:
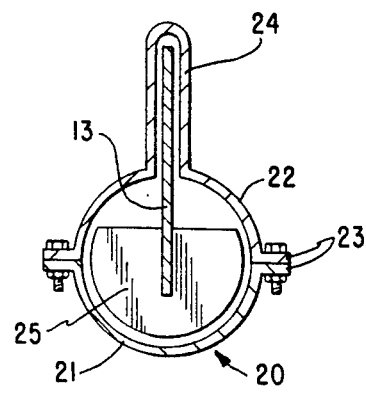
FIG. 4 is a partial sectional view similar to FIG. 3 showing an alternate form of flighting paddle.

The first embodiment has been described and shown with a trough 10 of rectangular cross section. The alternate cross sectional shape shown in FIG. 4 may have some advantages. Here the cross section of the trough 20 is substantially circular. For small amounts of material, this shape causes a concentration at the bottom of the trough resulting in a somewhat deeper stream which will be easier to move.

In this embodiment, the trough 20 can be made in two parts. The lower trough 21 and the upper cover 22 and fastened together with matching flanges 23. The cover, over a large part of the trough is formed with a slotted peak 24 through which the belt 13 runs. At the pulleys, the cover obviously will have to be expanded to cover them, but along the principal runs of the belt, these covers can act as a guide to control the course and the position of the belt. The flight units 25 are formed to fit into the channel formed by the trough 21 and its cover 22 and may fill all or only part of the channel.

The enclosed channel in the second embodiment has certain advantages in the avoidance of spillage and the control of dust from the material being moved. It will be obvious that the use of the cover does not depend on the shape of the channel but that a rectangular channel is as possible as a circular or oval one.

Thus, by the use of a vertically disposed belt pulling the flighting, I have made possible a vibration-free drag conveyor which can be used to transport material either in a straight line or in a course having bends. Discharge from the trough may be provided for simply by opening the bottom of the trough and providing any desired type of chute. It is also envisioned that screens may be used as a discharge to provide a sorting formation based on the size of the particles of material being used.

I claim as my invention:

1. A drag type conveyor comprising a trough, flight units movably disposed transversely of said trough, flexible belt means joining and extending above said flight units, said belt means being flat and having its longer sides in a substantially vertical plane, power means in driving engagement with said belt means whereby said flight units are caused to move a material longitudinally of said trough, said power means including a driver pulley engaged with the portion of said belt means which extends above said flight units.

2. The conveyor of claim 1 in which idler pulleys are also mounted on said trough, said belt means being engaged with said idler pulleys to cause a change in direction of said belt means.

3. The conveyor of claim 1 in which said trough includes a cover part enclosing an elongated passageway, said flight units being disposed in said passage way.

4. The conveyor of claim 3 in which said cover part is formed with an elongated portion adapted to embrace said belt means whereby said belt means is guided in a particular path.

* * * * *